(12) United States Patent
Jeong et al.

(10) Patent No.: US 12,221,499 B2
(45) Date of Patent: Feb. 11, 2025

(54) CATALYST FOR OLEFIN POLYMERIZATION AND POLYOLEFIN PREPARED USING THE SAME

(71) Applicant: HANWHA SOLUTIONS CORPORATION, Seoul (KR)

(72) Inventors: Yujeong Jeong, Daejeon (KR); Ahreum Kim, Daejeon (KR); Junho Seo, Daejeon (KR); Munhee Lee, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 890 days.

(21) Appl. No.: 17/415,581

(22) PCT Filed: Dec. 10, 2019

(86) PCT No.: PCT/KR2019/017335
§ 371 (c)(1),
(2) Date: Jun. 17, 2021

(87) PCT Pub. No.: WO2020/130452
PCT Pub. Date: Jun. 25, 2020

(65) Prior Publication Data
US 2022/0064344 A1    Mar. 3, 2022

(30) Foreign Application Priority Data

Dec. 18, 2018  (KR) .................. 10-2018-0163922

(51) Int. Cl.
| C08F 4/6592 | (2006.01) |
| C08F 4/643 | (2006.01) |
| C08F 4/659 | (2006.01) |
| C08F 210/16 | (2006.01) |
| C08J 5/18 | (2006.01) |

(52) U.S. Cl.
CPC ........ *C08F 210/16* (2013.01); *C08F 4/65904* (2013.01); *C08F 4/65908* (2013.01); *C08F 4/65925* (2013.01); *C08F 4/65927* (2013.01); *C08J 5/18* (2013.01); *C08J 2323/08* (2013.01)

(58) Field of Classification Search
None
See application file for complete search history.

(56) References Cited

U.S. PATENT DOCUMENTS

| 2008/0021183 A1 | 1/2008 | Graham |
| 2010/0331501 A1 | 12/2010 | Murray |
| 2018/0155474 A1 | 6/2018 | Holtcamp |

FOREIGN PATENT DOCUMENTS

| CN | 101935366 A | 1/2011 |
| CN | 113166318 A | 7/2021 |
| EP | 2032617 B1 | 3/2011 |

(Continued)

OTHER PUBLICATIONS

JP Office Action dated Jun. 15, 2022.

(Continued)

*Primary Examiner* — Caixia Lu
(74) *Attorney, Agent, or Firm* — Harvest IP Law, LLP

(57) ABSTRACT

The present invention relates to a catalyst for olefin polymerization. Specifically, the present invention relates to a hybrid catalyst, which is capable of preparing a polyolefin, particularly a linear low-density polyethylene, which has excellent processability and is capable of providing a film having good mechanical and optical properties.

14 Claims, 13 Drawing Sheets

Example 1

(56) References Cited

FOREIGN PATENT DOCUMENTS

| | | | |
|---|---|---|---|
| EP | 2448978 | B1 | 5/2016 |
| EP | 3239196 | A1 | 11/2017 |
| EP | 3851462 | A1 | 7/2021 |
| EP | 3851463 | A1 | 7/2021 |
| JP | 11106432 | A | 4/1999 |
| JP | 2007518871 | A | 7/2007 |
| JP | 2015160859 | A | 9/2015 |
| JP | 2016-188318 | A | 11/2016 |
| JP | 2018513223 | A | 5/2018 |
| KR | 1020090031592 | A | 3/2009 |
| KR | 1020120038798 | A | 4/2012 |
| KR | 1020120035165 | A | 5/2012 |
| KR | 1020120052904 | A | 5/2012 |
| KR | 1020120081318 | A | 7/2012 |
| KR | 101401851 | B1 | 5/2014 |
| WO | 2012033670 | A1 | 3/2012 |

OTHER PUBLICATIONS

International Search report dated Mar. 27, 2020.
CN OA dated Nov. 28, 2022.
European Search Report (EESR) dated Aug. 11, 2022.

[Fig. 1]
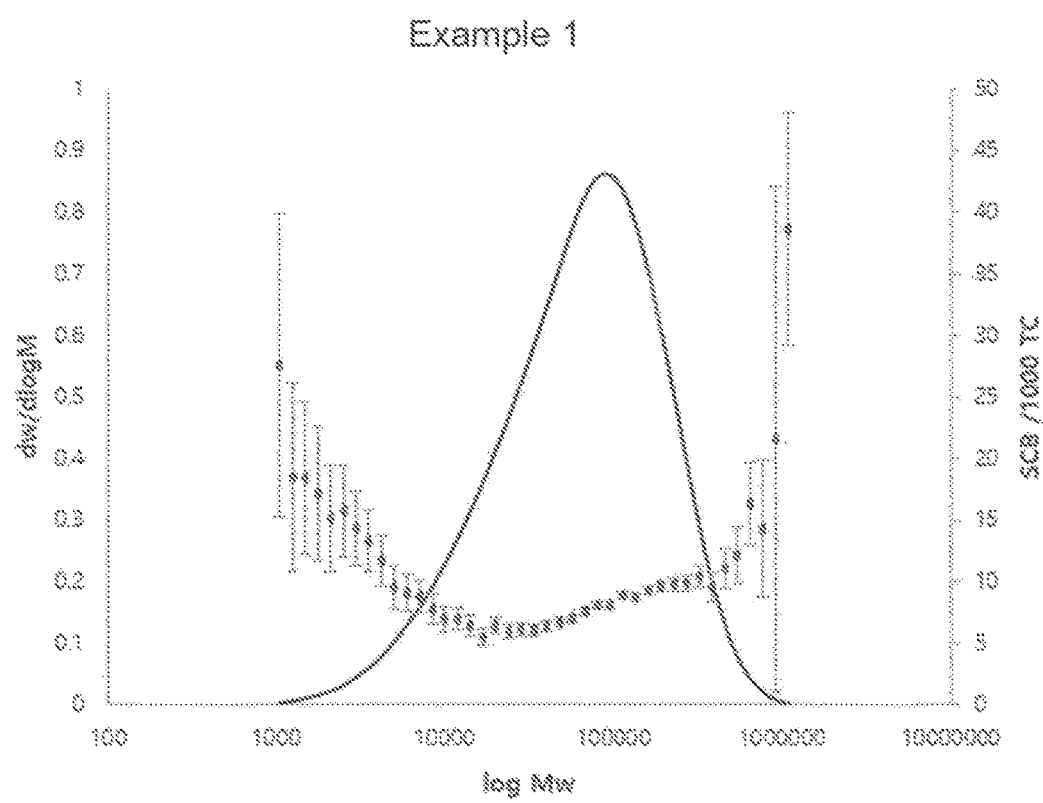

[Fig. 2]
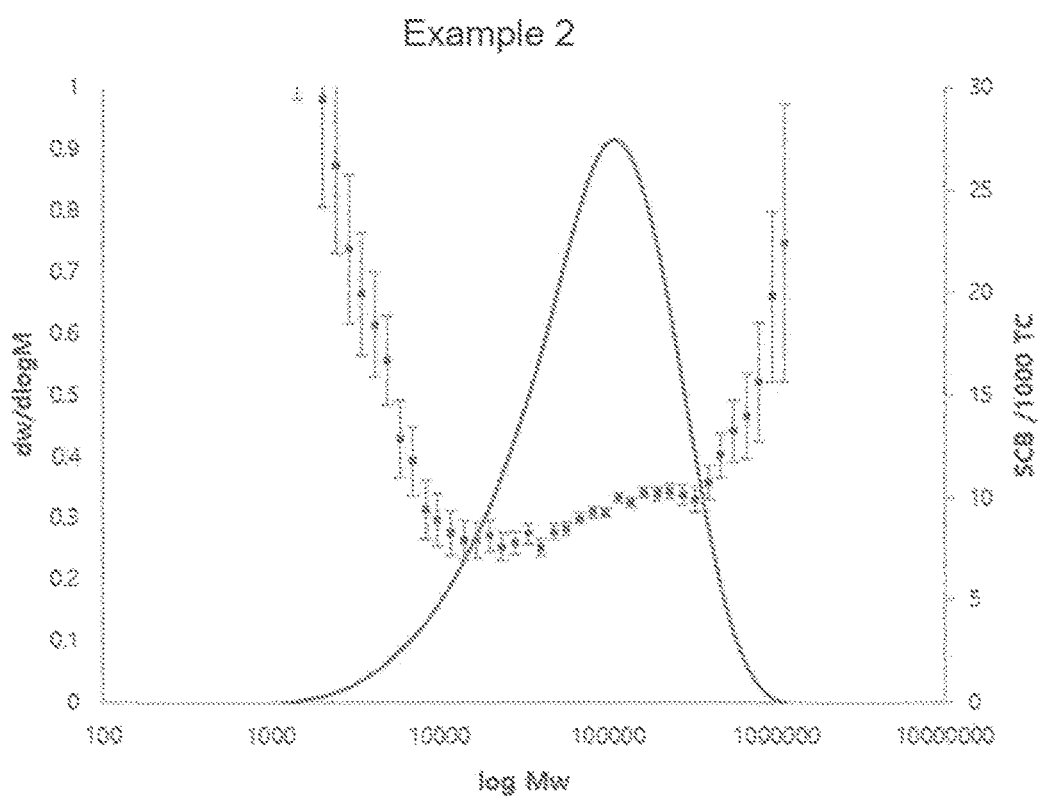

[Fig. 3]
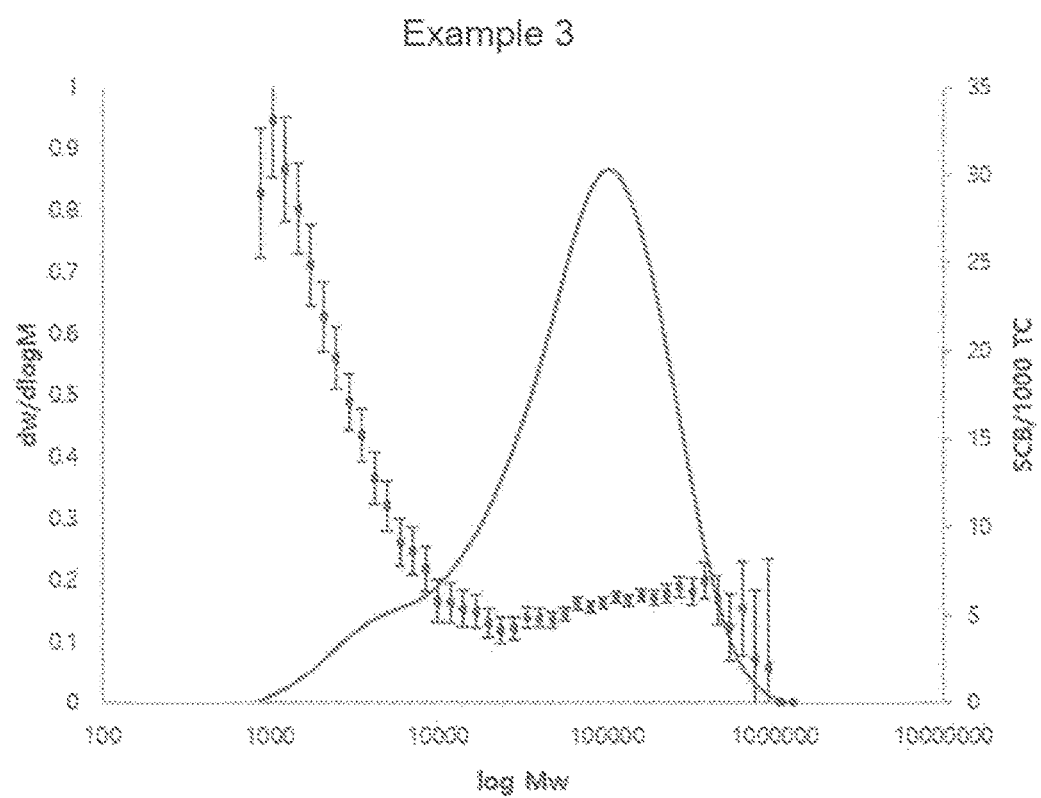

[Fig. 4]
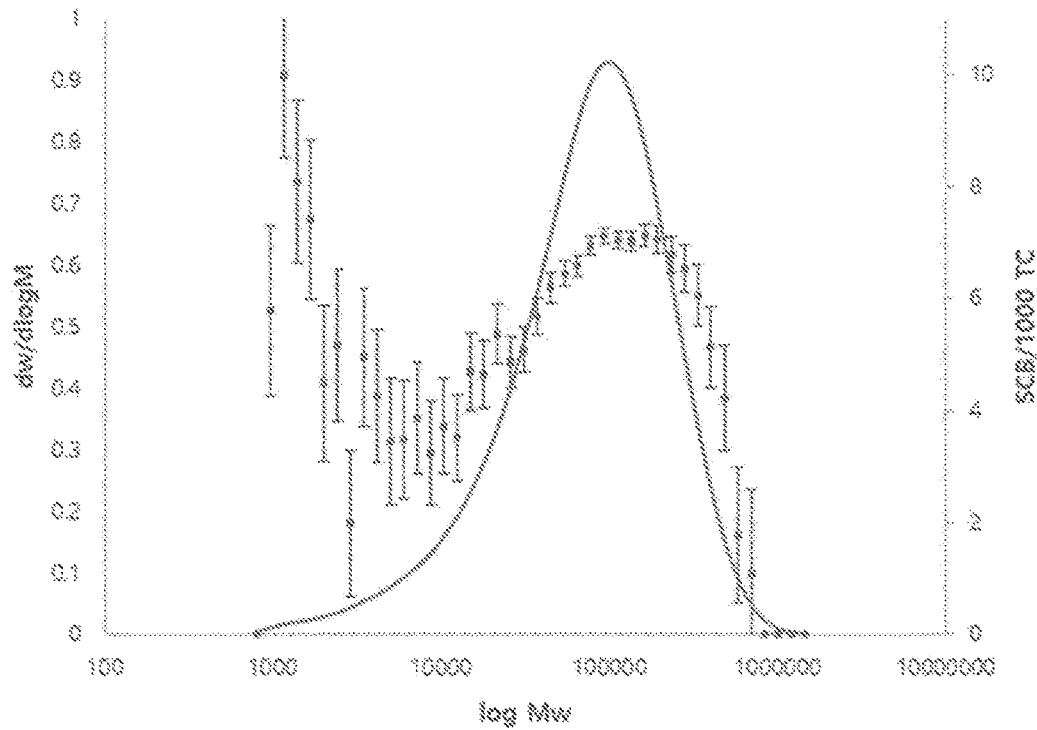

[Fig. 5]
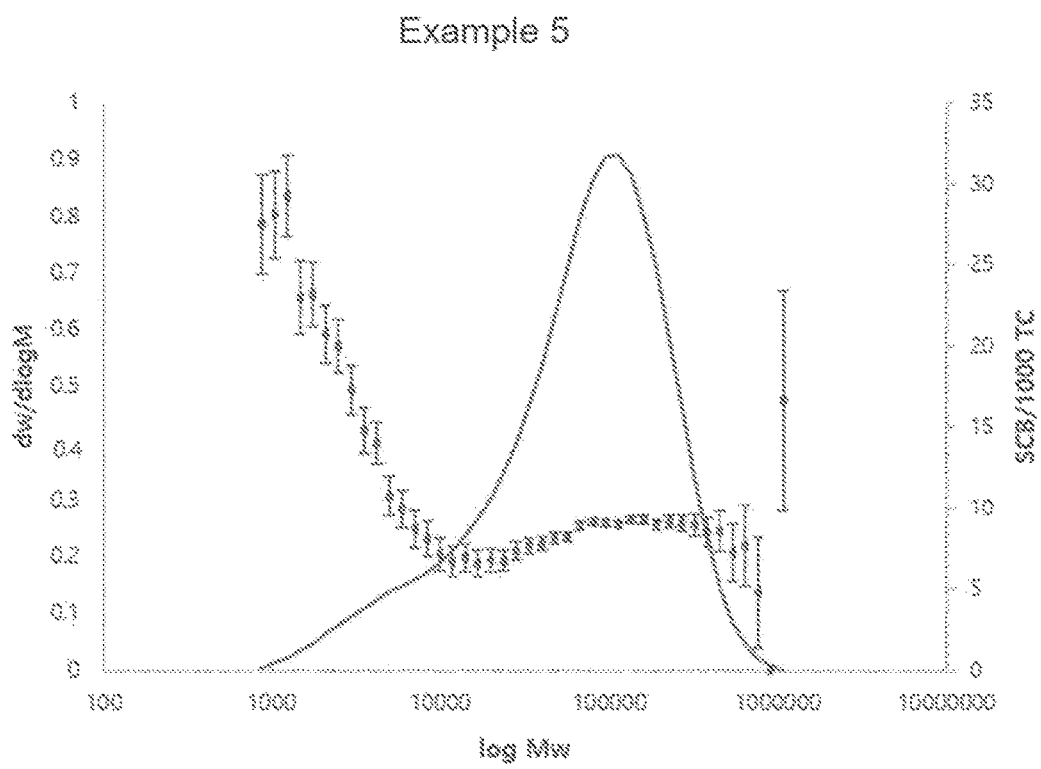

[Fig. 6]
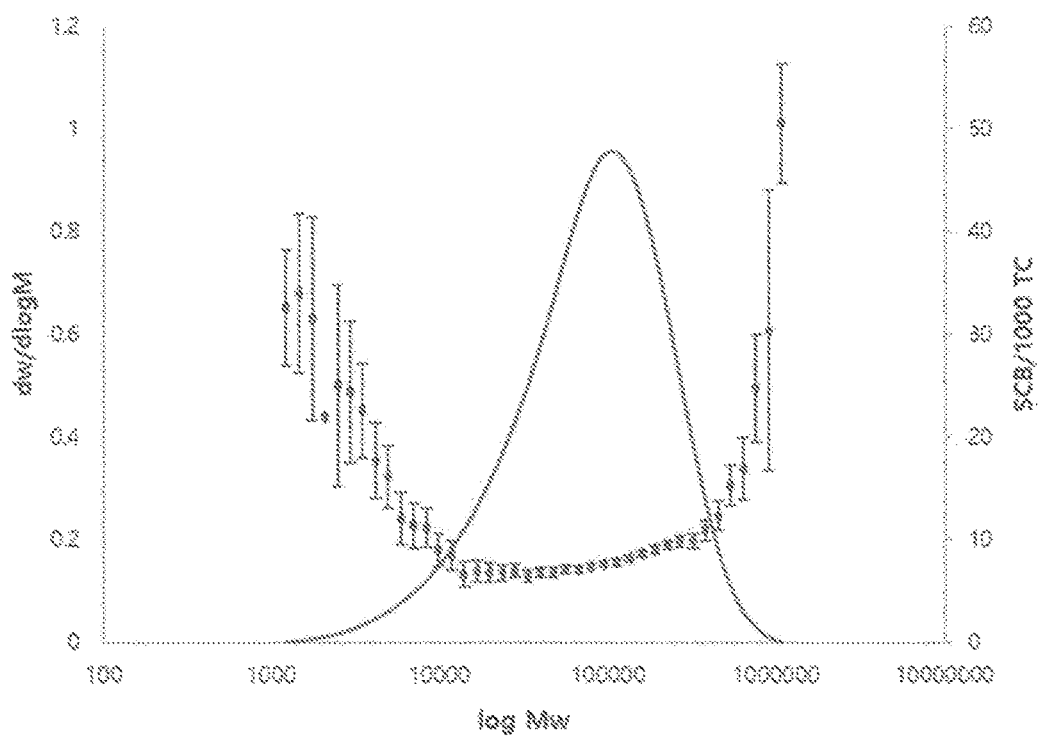

[Fig. 7]
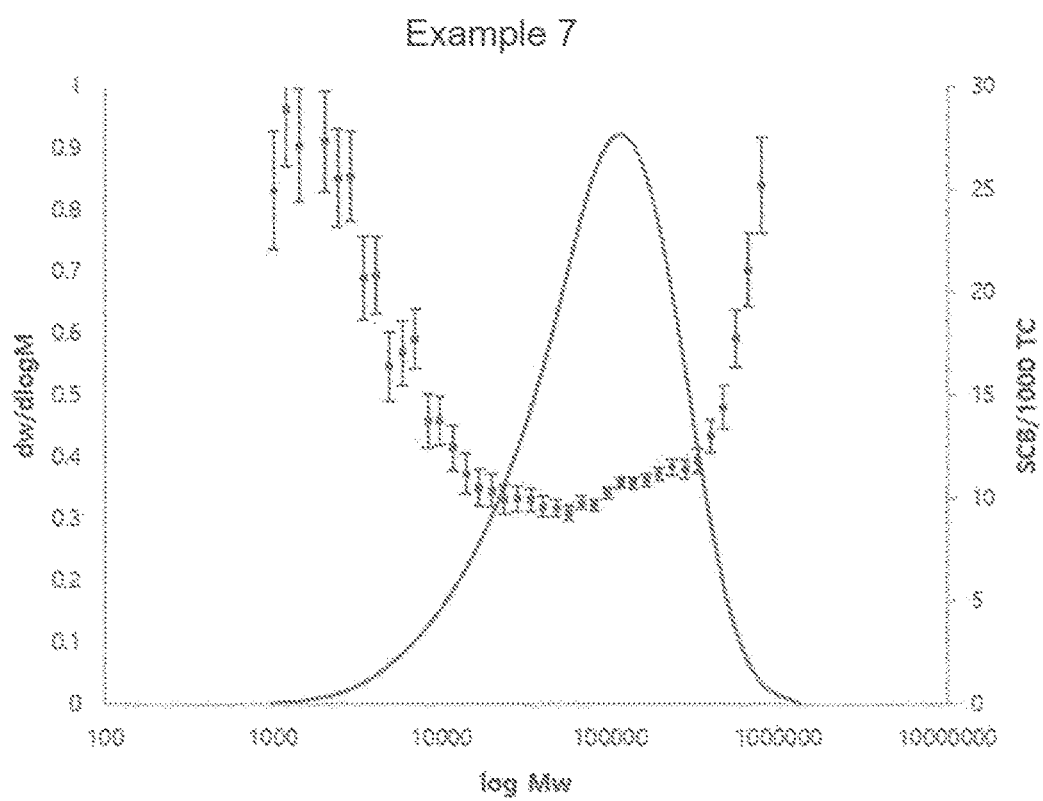

[Fig. 8]
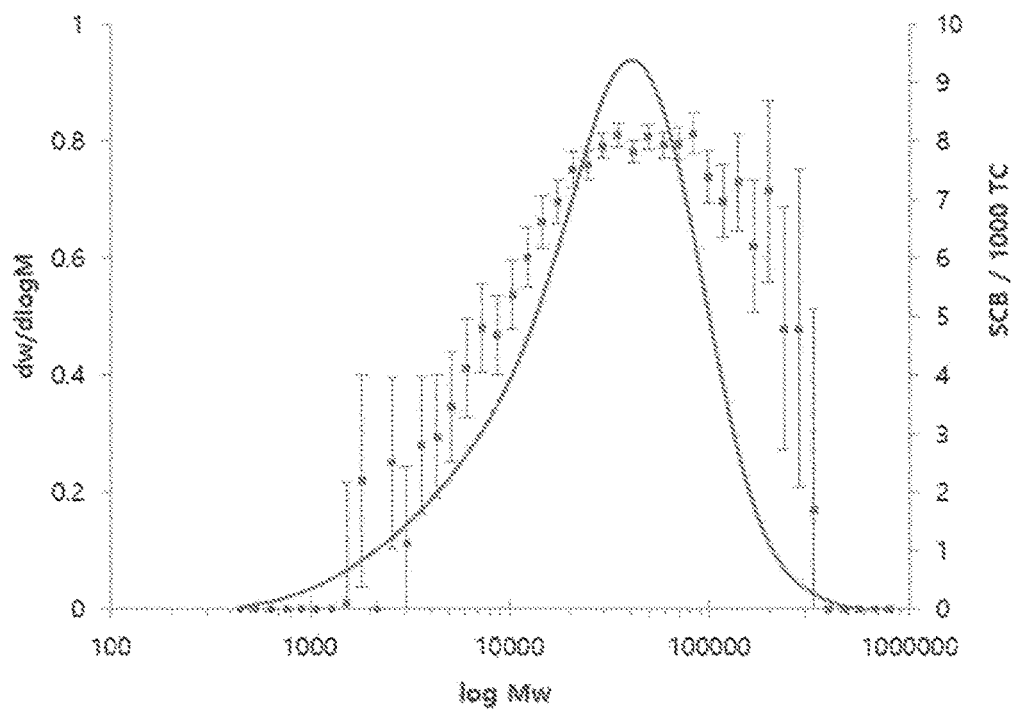

[Fig. 9]
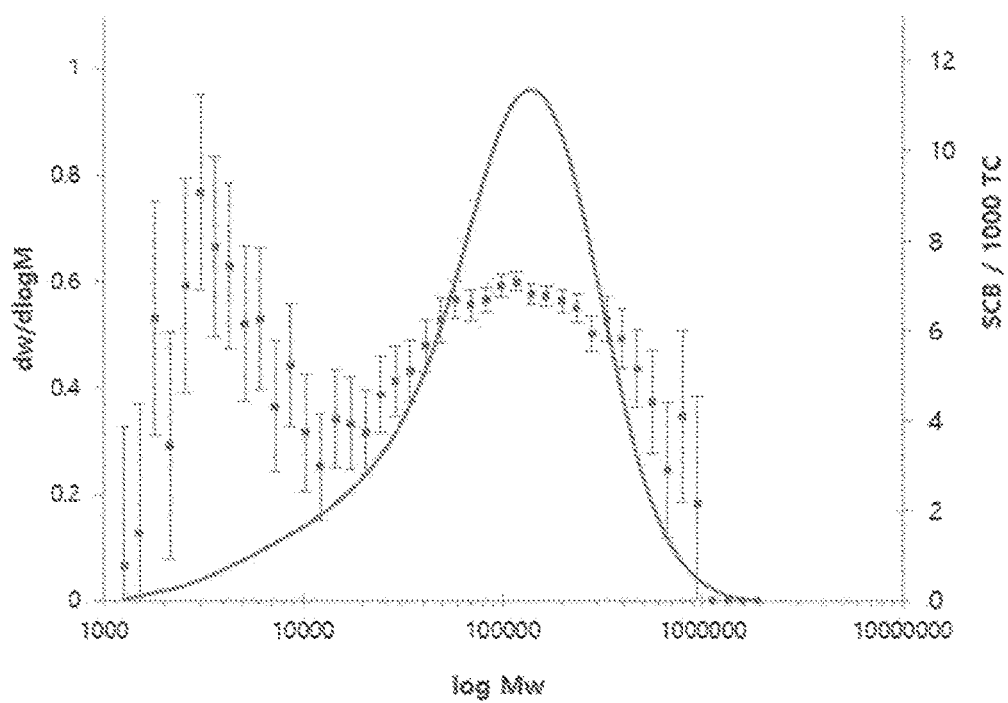

[Fig. 10]
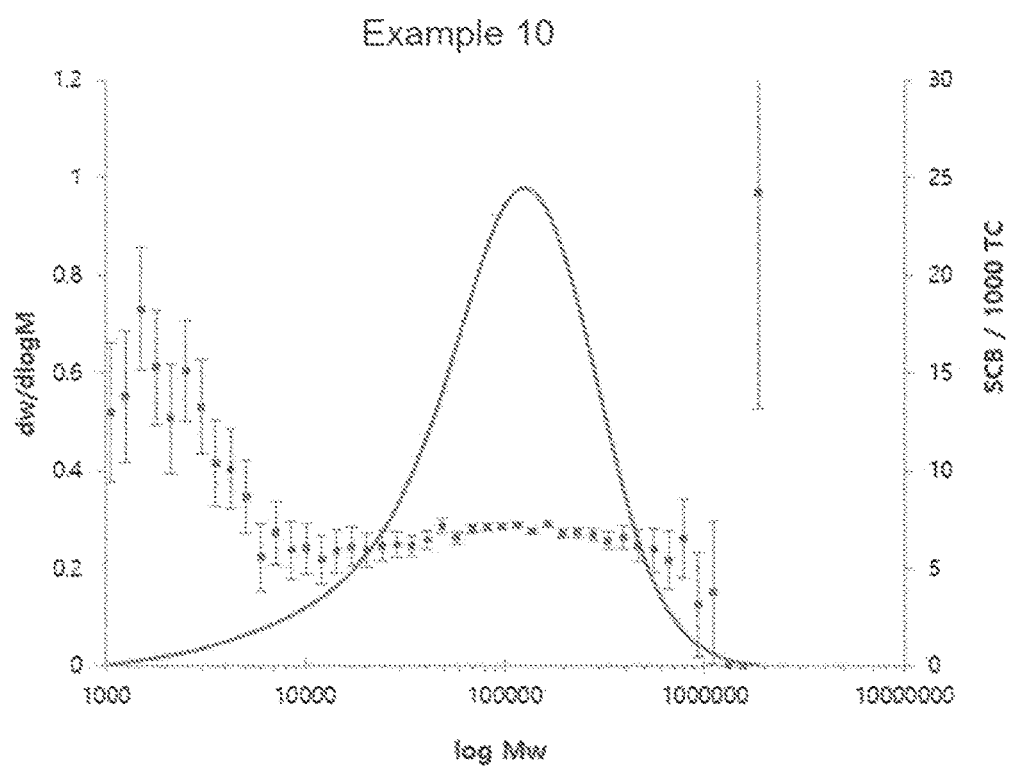

[Fig. 11]
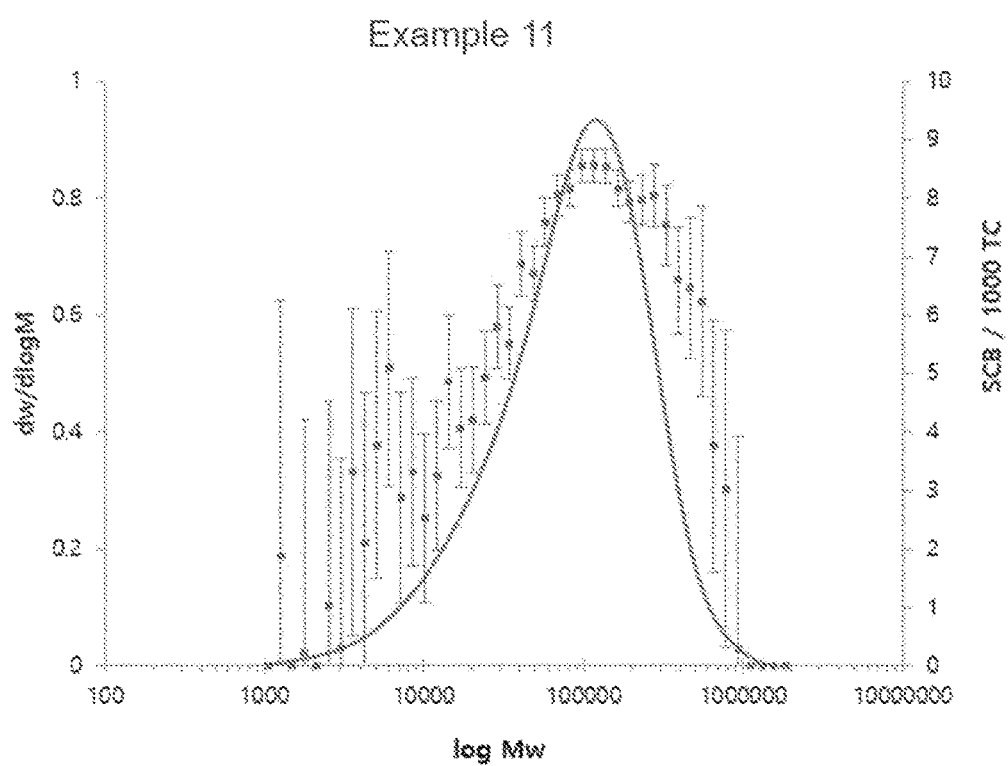

[Fig. 12]
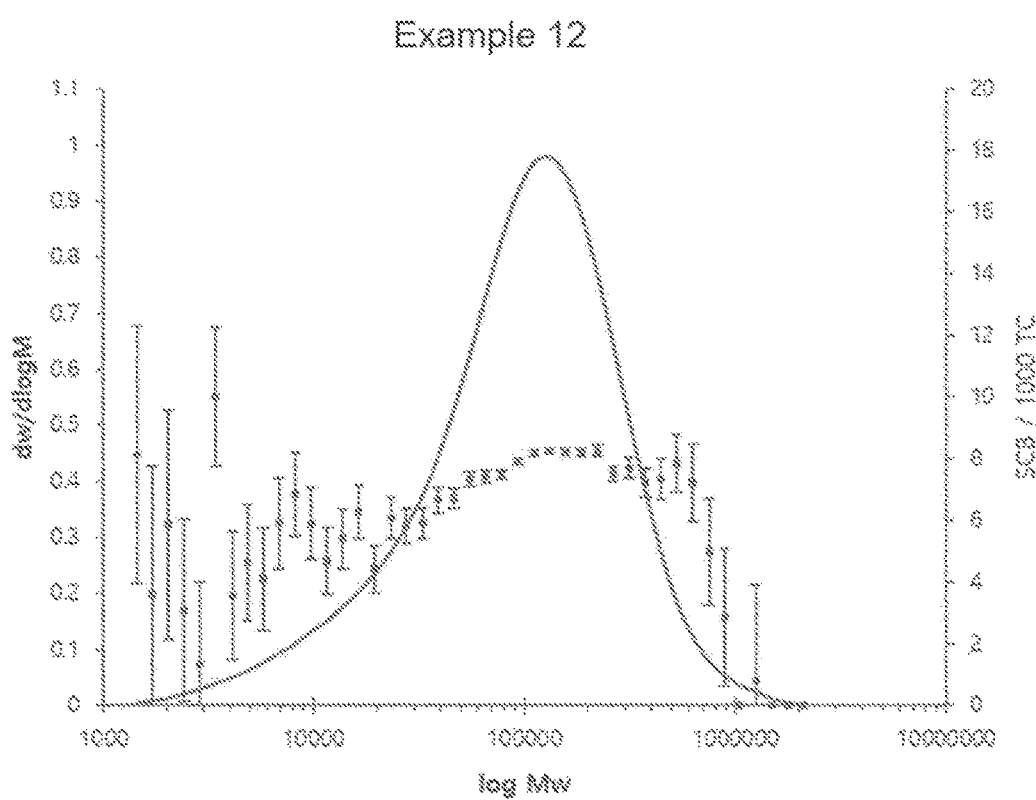

[Fig. 13]
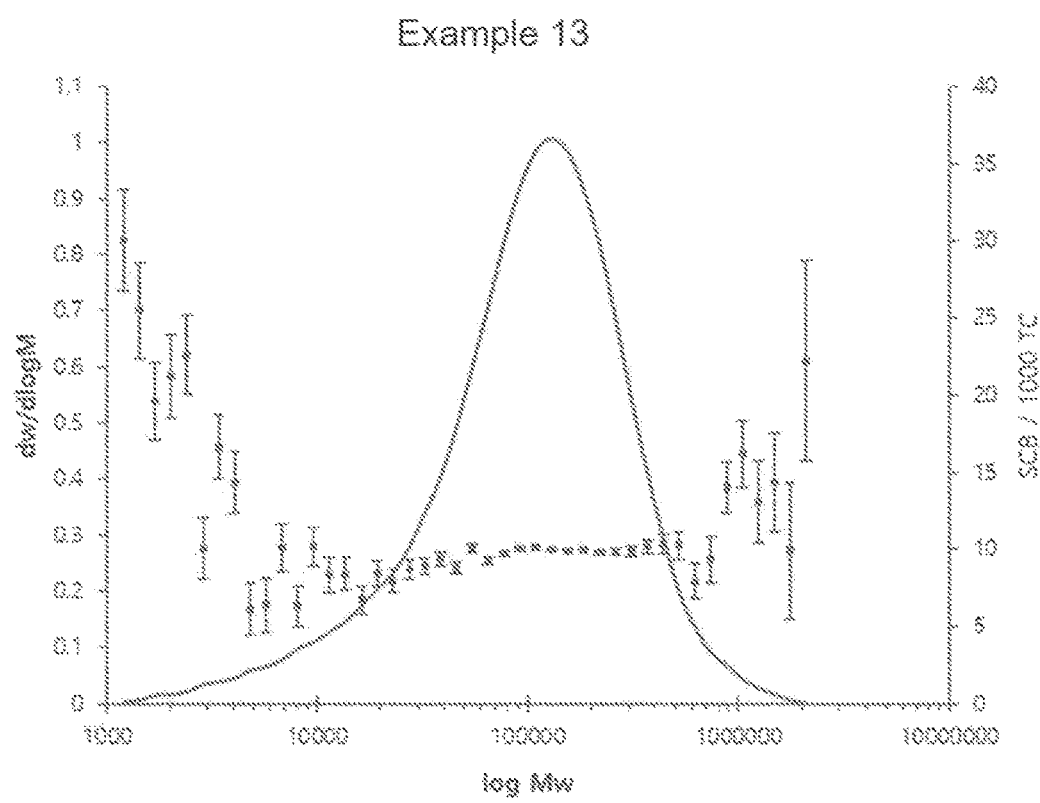

CATALYST FOR OLEFIN POLYMERIZATION AND POLYOLEFIN PREPARED USING THE SAME

CROSS-REFERENCE TO RELATED APPLICATIONS

This application is a National Stage of International Application No. PCT/KR2019/017335 filed Dec. 10, 2019, claiming priority based on Korean Patent Application No. 10-2018-0163922 filed Dec. 18, 2018.

TECHNICAL FIELD

The present invention relates to a catalyst for olefin polymerization and to a polyolefin prepared using the same. Specifically, the present invention relates to a hybrid supported catalyst comprising different transition metal compounds and to a polyolefin, particularly a linear low-density polyethylene, which is prepared using the same, has excellent processability, and is capable of preparing a film having good mechanical and optical properties.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution and a uniform distribution of comonomers.

Meanwhile, a linear low-density polyethylene (LLDPE) is produced by copolymerizing ethylene and an alpha-olefin at a low pressure using a polymerization catalyst. It has a narrow molecular weight distribution and short chain branches (SCBs) having a certain length, but generally does not have long chain branches (LCBs). Films prepared from a linear low-density polyethylene have high strength at breakage, elongation, tear strength, and impact strength in addition to the characteristics of common polyethylenes. They are widely used for stretch films and overlap films to which conventional low-density polyethylenes or high-density polyethylene are difficult to be applied.

When a linear low-density polyethylene produced by a metallocene catalyst has excellent processability and haze of a film, the strength of the film tends to decrease. On the other hand, when the film has excellent strength, the processability and haze tend to decrease.

Accordingly, there has been a need for a metallocene catalyst for preparing a polyolefin having excellent processability and capable of providing a film with good mechanical and optical properties.

DETAILED DESCRIPTION OF THE INVENTION

Technical Problem

An object of the present invention is to provide a hybrid supported catalyst comprising different transition metal compounds and a polyolefin, particularly a linear low-density polyethylene, which is prepared using the same, has excellent processability, and is capable of preparing a film having good mechanical and optical properties.

Technical Solution

According to an embodiment of the present invention for achieving the object, there is provided a catalyst for olefin polymerization, which comprises a first transition metal compound represented by Formula A and a second transition metal compound represented by Formula B.

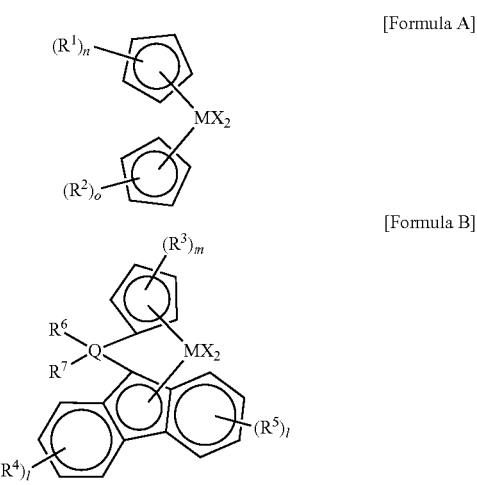

[Formula A]

[Formula B]

In Formulae A and B, n and o are each an integer of 0 to 5, m and l are each an integer of 0 to 4, M is titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, Q is carbon (C), silicon (Si), germanium (Ge), or tin (Sn), $R^1$ to $R^5$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that $R^1$ to $R^5$ are each independently capable of being linked to adjacent groups to form a substituted or unsubstituted saturated or unsaturated $C_{4-20}$ ring, and $R^6$ and $R^7$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that at least one of $R^6$ and $R^7$ is substituted or unsubstituted $C_{1-20}$ alkyl.

Specifically, in Formulae A and B, n and o are each an integer of 0 to 3, m and l are each 1 or 2, X is each independently halogen, M is zirconium, Q is carbon, $R^1$ and $R^2$ are each independently $C_{1-20}$ alkyl or linked to adjacent groups to form a substituted or unsubstituted unsaturated $C_{4-20}$ ring, $R^3$ to $R^5$ are each $C_{1-20}$ alkyl, and $R^6$ and $R^7$ are each $C_{1-20}$ alkyl, $C_{2-20}$ alkenyl, or $C_{6-20}$ aryl, provided that at least one of $R^6$ and $R^7$ is $C_{1-20}$ alkyl.

Preferably, the compound represented by Formula A may be one of the compounds represented by Formulae A-1 to A-4, and the compound represented by Formula B may be one of the compounds represented by Formulae B-1 to B-3.

[Formula A-1]

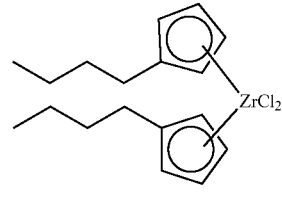

[Formula A-2]

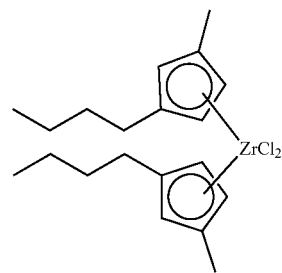

[Formula A-3]

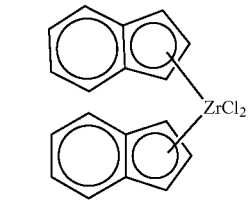

[Formula A-4]

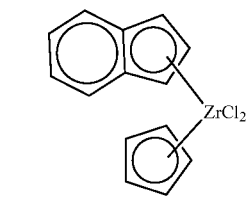

[Formula B-1]

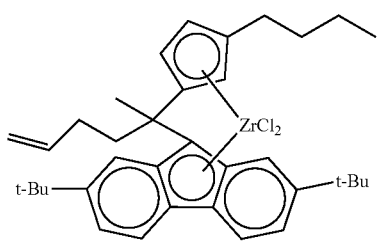

[Formula B-2]

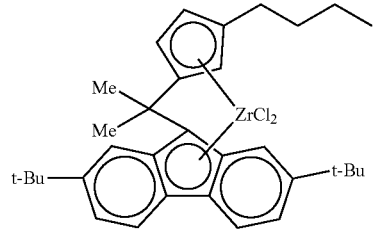

[Formula B-3]

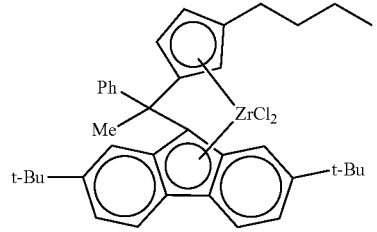

Preferably, the catalyst for olefin polymerization comprises the first transition metal compound and the second transition metal compound at a weight ratio of 20:1 to 1:20.

The catalyst for olefin polymerization according to an embodiment of the present invention may further comprise a cocatalyst compound selected from the group consisting of a compound represented by Formula 1, a compound represented by Formula 2, and a compound represented by Formula 3.

[Formula 1]

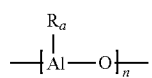

[Formula 2]

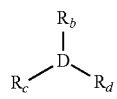

$[L\text{-}H]^+[Z(A)_4]^-$ or $[L]^+[Z(A)_4]^-$  [Formula 3]

In Formula 1, n is an integer of 2 or more, and $R_a$ may each independently be a halogen atom, $C_{1-20}$ hydrocarbon, or $C_{1-20}$ hydrocarbon substituted with halogen.

In Formula 2, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy.

In Formula 3, L is a neutral or cationic Lewis acid, $[L\text{-}H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

Specifically, the compound represented by Formula 1 is at least one selected from the group consisting of methylaluminoxane, ethylaluminoxane, isobutylaluminoxane, and butylaluminoxane.

In addition, the compound represented by Formula 2 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexyaluminum, trioctyaluminum, ethyl dimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

In addition, the compound represented by Formula 3 is at least one selected from the group consisting of triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

Preferably, the catalyst for olefin polymerization further comprises a carrier for supporting the first transition metal compound, the second transition metal compound, or both. specifically, the carrier may support all of the first transition metal compound, the second transition metal compound, and the cocatalyst.

Here, the total amount of the first transition metal compound and the second transition metal compound supported on the carrier is 0.001 to 1 mmole based on 1 g of the carrier. The amount of the cocatalyst compound supported on the carrier is 2 to 15 mmoles based on the 1 g of the carrier.

Specifically, the carrier may comprise at least one selected from the group consisting of silica, alumina, and magnesia. More specifically, the carrier is silica.

Preferably, the catalyst for olefin polymerization may be a hybrid supported catalyst in which the first transition metal compound and the second transition metal compound are supported together. More preferably, it may be a hybrid supported catalyst in which the first transition metal compound and the second transition metal compound are supported together on a single carrier.

Specifically, the catalyst for olefin polymerization is a hybrid supported catalyst in which the first transition metal compound, the second transition metal compound, and the cocatalyst compound are supported together on silica.

According to another embodiment of the present invention, there is provided a polyolefin having (1) a molecular weight distribution represented as a polydispersity index (Mw/Mn) of 2.0 to 10.0, (2) a density of 0.910 to 0.940 g/cm$^3$, (3) a melt index of 0.2 to 10.0 g/10 minutes when measured at 190° C. under a load of 2.16 kg, and (4) a melt index ratio ($MI_{2.16}/MI_{2.16}$) of 20 to 30.

Preferably, the weight average molecular weight (Mw) of the polyolefin is 50,000 to 200,000 g/mole.

The polyolefin has a BOCD index of 0 to 3.0 as defined by the following Equation 1.

BOCD index=(content of short chain branches in the high-molecular weight component−content of short chain branches in the low-molecular weight component)/(content of short chain branches in the low-molecular weight component) [Equation 1]

The polyolefin is a copolymer of an olefinic monomer and an olefinic comonomer. Specifically, the olefinic monomer is ethylene, and the olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

Preferably, the polyolefin is a linear low-density polyethylene in which the olefinic monomer is ethylene, and the olefinic comonomer is 1-hexene.

According to another embodiment of the present invention, there is provided a film molded from the polyolefin.

The film has a haze of 30% or less and a transparency of 70% or more.

Advantageous Effects of the Invention

The hybrid metallocene catalyst for olefin polymerization according to an embodiment of the present invention has excellent processability and is capable of providing a polyolefin, particularly a linear low-density polyolefin, having good mechanical and optical properties. Accordingly, a film produced therefrom can be advantageously used as a stretch film, an overlap film, or the like.

BRIEF DESCRIPTION OF THE DRAWING

FIGS. 1 to 13 are GPC-FTIR graphs for measuring the BOCD index of the polyolefins of Examples 1 to 13 of the present invention, respectively.

BEST MODE FOR CARRYING OUT THE INVENTION

Hereinafter, the present invention will be described in more detail.

Catalyst for Olefin Polymerization

The catalyst for olefin polymerization according to an embodiment of the present invention comprises a first transition metal compound represented by Formula A and a second transition metal compound represented by Formula B.

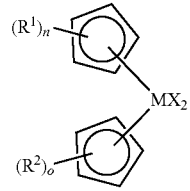

[Formula A]

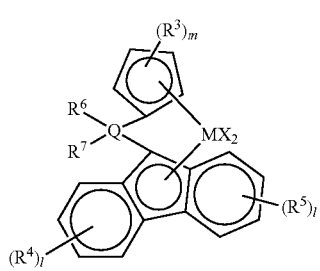

[Formula B]

In Formulae A and B, n and o are each an integer of 0 to 5, and m and l are each an integer of 0 to 4, Specifically, n and o may each be an integer of 1 to 3, and m and l may each be 1 or 2.

M is titanium (Ti), zirconium (Zr), or hafnium (Hf). Specifically, M may be zirconium (Zr).

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene. Specifically, X may each be halogen. More specifically, X may each be chlorine (Cl).

Q is carbon (C), silicon (Si), germanium (Ge), or tin (Sn). Specifically, Q may be carbon (C).

$R^1$ to $R^5$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that $R^1$ to $R^5$ are each independently capable of being linked to adjacent groups to form a substituted or unsubstituted saturated or unsaturated $C_{4-20}$ ring.

Specifically, $R^1$ and $R^2$ may each independently be $C_{1-20}$ alkyl or linked to adjacent groups to form a substituted or unsubstituted saturated or unsaturated $C_4$-20 ring.

Specifically, $R^3$ may be $C_{1-20}$ alkyl. More specifically, $R^3$ may be $C_{1-6}$ alkyl. Preferably, $R^3$ is n-butyl.

Specifically, $R^4$ and $R^5$ may each be $C_{1-20}$ alkyl. More specifically, $R^4$ and $R^5$ may each be $C_{1-6}$ alkyl. Preferably, $R^4$ and $R^5$ are each t-butyl.

$R^6$ and $R^7$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, provided that at least one of $R^6$ and $R^7$ is substituted or unsubstituted $C_{1-20}$ alkyl.

Specifically, $R^6$ and $R^7$ are each $C_{1-20}$ alkyl, $C_{2-20}$ alkenyl, or $C_{6-20}$ aryl, provided that at least one of $R^6$ and $R^7$ is $C_{1-20}$ alkyl. More specifically, at least one of $R^6$ and $R^7$ is methyl.

In a preferred embodiment of the present invention, the compound represented by Formula A may be any one of the compounds represented by Formulae A-1 to A-4. In addition, the compound represented by Formula B may be a compound represented by Formulae B-1 to B-3.

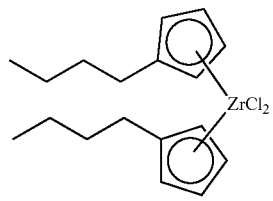

[Formula A-1]

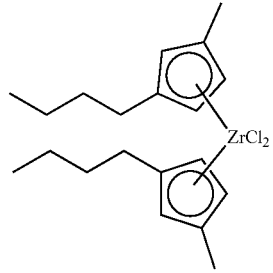

[Formula A-2]

[Formula A-3]

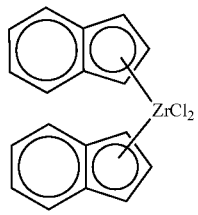

[Formula A-4]

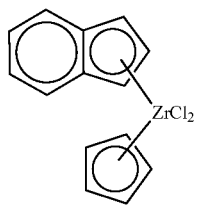

[Formula B-1]

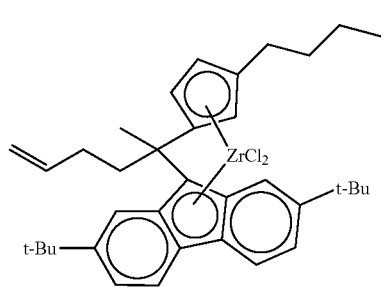

[Formula B-2]

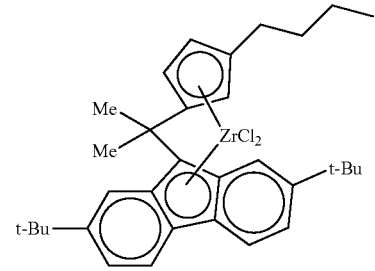

[Formula B-3]

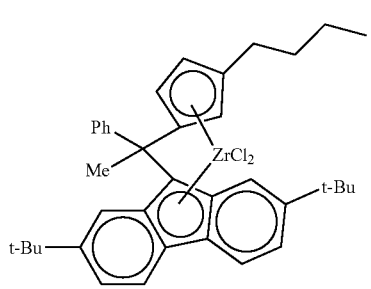

The catalyst for olefin polymerization according to an embodiment of the present invention may comprise the first transition metal compound and the second transition metal compound at a weight ratio of 20:1 to 1:20. Preferably, the catalyst for olefin polymerization may comprise the first transition metal compound and the second transition metal compound at a weight ratio of 10:1 to 1:10. More preferably, the catalyst for olefin polymerization may comprise the first transition metal compound and the second transition metal compound at a weight ratio of 6:4 to 4:6. When the content ratio of the first transition metal compound and the second transition metal compound is within the above range, an appropriate activity of the supported catalyst may be exhibited, which may be advantageous from the viewpoint of maintaining the activity of the catalyst and economical efficiency. Further, a polyolefin prepared in the presence of the catalyst for olefin polymerization, which satisfies the above range, has excellent processability, and a film prepared therefrom may have good strength and haze.

In general, it is known that polyolefins containing a small amount of short chain branches (SCBs) have poor optical properties, and polyolefins containing a large amount of long chain branches (LCBs) have excessively high elasticity, thereby having poor mechanical properties.

Polyolefins prepared by the first transition metal compound alone contain a small amount of short chain branches and are relatively poor in optical properties. Polyolefins prepared by the second transition metal compound alone have a large amount of short chain branches and long chain branches, whereby they are excellent in optical properties, whereas they are relatively poor in mechanical properties. That is, it may be difficult to satisfy both optical and mechanical properties when any of the first transition metal compound and the second transition metal compound is used alone, or when the ratio of either the first transition metal compound or the second transition metal compound is excessively high.

In contrast, a catalyst for olefin polymerization, which comprises the first transition metal compound and the second transition metal compound at a weight ratio of 20:1 to 1:20, specifically 6:4 to 4:6, can produce a polyolefin having excellent processability with good haze and transparency.

As a preferred example, the catalyst for olefin polymerization according to an embodiment of the present invention may further comprise a cocatalyst compound.

Here, the cocatalyst compound may comprise at least one of a compound represented by Formula 1, a compound represented by Formula 2, and a compound represented by Formula 3.

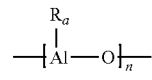

[Formula 1]

In Formula 1, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

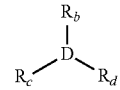

[Formula 2]

In Formula 2, D is aluminum (Al) or boron (B), and $R_b$, $R_c$, and $R_d$ are each independently halogen, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$$[L-H]^+[Z(A)_4]^- \text{ or } [L]^+[Z(A)_4]^- \qquad \text{[Formula 3]}$$

In Formula 3, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Examples of the compound represented by Formula 1 include methylaluminoxane, ethylaluminoxane, isobutylaluminoxane, butylaluminoxane, and the like. Preferred is methylaluminoxane. But it is not limited thereto.

Examples of the compound represented by Formula 2 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctyaluminum, ethyl dimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 3 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p- tolyl)aluminate, triethylammonium tetra(o,p-dimethylphenyl)aluminate, tributylammonium tetra(p-trifluoromethylphenyl)aluminate, trimethylammonium tetra(p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, tributylammonium tetra(p-trifluoromethylphenyl)borate, triphenylcarbonium tetra(p-trifluoromethylphenyl)borate, and triphenylcarbonium tetrapentafluorophenylborate.

As a preferred example, the catalyst for olefin polymerization according to an embodiment of the present invention may further comprise a carrier for supporting the first transition metal compound, the second transition metal compound, or both. Preferably, the catalyst for olefin polymerization may further comprise a carrier for supporting all of the first transition metal compound, the second transition metal compound, and the cocatalyst compound.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the first and second transition metal compounds and the cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be 200 to 900° C. The drying temperature may preferably be 300 to 800° C., more preferably 400 to 700° C. If the drying temperature is lower than 200° C., there would be too much moisture so that the moisture on the surface and the cocatalyst may react. If it exceeds 900° C., the structure of the carrier may collapse.

The dried silica may have a concentration of hydroxy groups of 0.1 to 5 mmole/g, preferably 0.7 to 4 mmole/g, and more preferably 1.0 to 2 mmole/g. If the concentration of hydroxy groups is less than 0.1 mmole/g, the amount of supported cocatalyst may be low. If it exceeds 5 mmole/g, there may arise a problem that the catalyst component may be deactivated.

As a method of supporting the transition metal compounds and the cocatalyst compound employed in a catalyst for olefin polymerization on the carrier, a physical adsorption method or a chemical adsorption method may be used.

For example, the physical adsorption method may be a method of contacting a solution in which a transition metal compound has been dissolved with a carrier and then drying the same; a method of contacting a solution in which a transition metal compound and a cocatalyst compound have been dissolved with a carrier and then drying the same; or a method of contacting a solution in which a transition metal compound has been dissolved with a carrier and then drying the same to prepare the carrier that supports the transition metal compound, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting a transition metal compound on the cocatalyst compound; or a method of covalently bonding a functional group on the surface of a carrier (e.g., a hydroxy group (—OH) on the silica surface in the case of silica) with a catalyst compound.

The total amount of the first transition metal compound and the second transition metal compound supported on a carrier may be 0.001 to 1 mmole based on 1 g of the carrier. When the content ratio of the transition metal compounds and the carrier satisfies the above range, an appropriate activity of the supported catalyst may be exhibited, which is advantageous from the viewpoint of maintaining the activity of the catalyst and economical efficiency.

The amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the first transition metal compound and the second transition metal compound may be supported on one type of a carrier, or the first transition metal compound and the second transition metal compound may be supported on two or more types of a carrier, respectively. In addition, either one of the first transition metal compound and the second transition metal compound may be supported on a carrier.

Preferably, the catalyst for olefin polymerization may be a hybrid supported catalyst in which the first transition metal compound and the second transition metal compound are supported together. More preferably, it may be a hybrid supported catalyst in which the first transition metal compound and the second transition metal compound are supported together on a single carrier.

For example, the catalyst for olefin polymerization may be a hybrid supported catalyst in which the first transition metal compound, the second transition metal compound, and the cocatalyst compound are supported together on silica. However, the examples of the present invention are not limited thereto.

Polyolefin

According to another embodiment of the present invention, there is provided a polyolefin prepared by polymerizing an olefinic monomer in the presence of the catalyst for olefin polymerization described above.

Here, the polyolefin may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by polymerization reaction such as free radical, cationic, coordination, condensation, and addition, but it is not limited thereto.

As a preferred example, the polyolefin may be prepared by a gas phase polymerization method, a solution polymerization method, a slurry polymerization method, or the like. When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

The polyolefin according to an embodiment of the present invention satisfies (1) a molecular weight distribution represented as a polydispersity index (Mw/Mn) of 2.0 to 10.0, (2) a density of 0.910 to 0.940 g/cm$^3$, (3) a melt index of 0.2 to 10.0 g/10 minutes when measured at 190° C. under a load of 2.16 kg, and (4) a melt index ratio ($MI_{2.16}/MI_{2.16}$) of 20 to 30.

The polyolefin is prepared in the presence of the hybrid supported catalyst for olefin polymerization as described above and has a relatively wide molecular weight distribution. Specifically, the polyolefin has a molecular weight distribution represented as a polydispersity index (Mw/Mn) of 2.0 to 10.0. Preferably, the molecular weight distribution represented as a polydispersity index (Mw/Mn) of the polyolefin may be 2.0 to 5.5, preferably 2.5 to 5.0. Since the polyolefin has a relatively wide molecular weight distribution, the polyolefin exhibits excellent processability, whereby a film prepared therefrom may have good impact resistance.

The polyolefin is a low-density polyethylene copolymer having a density in the range of 0.910 to 0.940 g/cm$^3$. Preferably, the density of the polyolefin is in the range of 0.915 to 0.938 g/cm$^3$, more preferably 0.920 to 0.935 g/cm$^3$. If the density of the polyolefin is within the above range, a film prepared from the polyolefin may have good impact resistance.

In the preparation of the polyolefin according to an embodiment of the present invention, the density of the polyolefin may be adjusted by the content of the alpha-olefin, preferably 1-hexene, relative to the content of ethylene. For example, the lower the content of alpha-olefin relative to ethylene, the higher the density. The higher the content of alpha-olefin, the lower the density. Thus, a polyolefin having a density within the above range may be prepared by adjusting the content of alpha-olefin relative to the content of ethylene in the polyolefin.

The polyolefin of the present invention has a melt index of 0.2 to 10.0 g/10 minutes when measured at 190° C. under a load of 2.16 kg according to ASTM D1238. Preferably, the melt index of the polyolefin is in the range of 0.3 to 5.0 g/10 minutes, more preferably 0.3 to 2.0 g/10 minutes, when measured at 190° C. under a load of 2.16 kg. If the melt index of the polyolefin is within the above range, it is possible to balance the processability of the polyolefin and the mechanical properties of a film obtained therefrom.

The polyolefin of the present invention has a melt flow ratio (MFR) of 20 to 30, which is a value obtained by dividing the melt index measured at 190° C. under a load of 21.6 kg by the melt index measured at 190° C. under a load of 2.16 kg according to ASTM D1238. Preferably, the MFR of the polyolefin is in the range of 22 to 29. If the MFR of the polyolefin is within the above range, it exhibits excellent processability and is particularly suitable for preparing a blown film.

The polyolefin according to an embodiment of the present invention may have a weight average molecular weight (Mw) of 50,000 to 250,000 g/mole. Preferably, the weight average molecular weight (Mw) may be 90,000 to 160,000 g/mole. Here, the weight average molecular weight is a value measured using gel permeation chromatography (GPC) and converted based on standard polystyrene. If the weight average molecular weight of the polyolefin is within the above range, the mechanical properties of a film produced therefrom may be good.

The polyolefin according to an embodiment of the present invention may have a BOCD index of 0 to 3.0.

Here, the BOCD index refers to a measure of how many short chain branches having 2 to 6 carbon atoms attached to the main chain of a polymer are present in a relatively high molecular weight component. If the BOCD index is 0 or less, it is not a polymer having a BOCD structure. If it is greater than 0, it may be regarded as a polymer having a BOCD structure.

The molecular weight, molecular weight distribution, and content of short chain branches of a polymer may be measured simultaneously and continuously using a GPC-FTIR device. The BOCD index may be calculated by the following Equation 1 by measuring the content of short chain branches (unit: number/1000 C) in the 30% range of left and right (60% in total) in the molecular weight distribution (MWD) based on weight average molecular weight (Mw).

BOCD index=(content of short chain branches in the high-molecular weight component−content of short chain branches in the low-molecular weight component)/(content of short chain branches in the low-molecular weight component) [Equation 1]

In a polymer having a BOCD structure, tie molecules such as short chain branches are more present in the high molecular weight component that is relatively responsible for physical properties than the low molecular weight component, whereby it may have excellent physical properties such as impact strength.

Film

According to still another embodiment of the present invention, there is provided a film molded from the polyolefin.

The film according to an embodiment of the present invention comprises the polyolefin of the present invention. Thus, it is excellent in optical properties such as haze and transparency and in mechanical properties such as impact strength. It is understood that since the polyolefin of the present invention has a relatively wide molecular weight distribution, and since short chain branches are relatively more present in the high molecular weight component, a film produced therefrom is good in haze and transparency.

Specifically, the film according to an embodiment of the present invention has a haze of 30% or less and a transparency of 70% or more.

As an exemplary example, the film of the present invention has a haze of 28% or less, preferably 27% or less, and more preferably 26.5% or less.

In addition, the film of the present invention has a transparency of 70% or more, preferably 75% or more.

There is no particular limitation to the method for producing a film according to the embodiment of the present invention, and any method known in the technical field of the present invention can be used. For example, the polyolefin according to an embodiment of the present invention may be molded by a conventional method such as blown film molding, extrusion molding, casting molding, or the like to prepare a film. Blown film molding among the above is the most preferred.

Embodiments for Carrying Out the Invention

Hereinafter, the present invention is explained in detail with reference to the following examples and comparative examples. However, the following examples are intended to further illustrate the present invention. The scope of the present invention is not limited thereto only.

Preparation Example 1

The transition metal compounds of Formulae A-1, A-2, and A-3 purchased from sPCI were used without purification, and the transition metal compounds of Formula A-4 and B-1 to B-3 were purchased from MCN and used without further purification.

0.024 g of the compound of Formula A-1 and 0.035 g of the compound of Formula B-1 were mixed with 14.0 g of a toluene solution of 10% by weight of methylaluminumoxane (MAO) in a glove box, which was stirred at room temperature for 1 hour. Meanwhile, 3.5 g of silica (XP2402) was charged to a reactor, and 30 ml of purified toluene was added thereto, followed by mixing thereof. Thereafter, the transition metal compounds solution was injected into the silica slurry, which was stirred in an oil bath at 75° C. for 3 hours. The supported catalyst was washed three times with toluene and dried at 60° C. under vacuum for 30 minutes to obtain 4.8 g of a hybrid supported catalyst in the form of a free-flowing powder.

Preparation Examples 2 to 13

A hybrid supported catalyst was prepared in the same manner as in Preparation Example 1, except that the types and contents of the first transition metal compound and the second transition metal compound were changed as shown in Table 1 below.

Example 1

An ethylene/1-hexene copolymer was prepared in the presence of the hybrid supported catalyst obtained in Preparation Example 1 in a 2-liter autoclave reactor. Specifically, the reactor was purged with nitrogen at 100° C. for about 1 hour to remove moisture and oxygen. 0.8 liter of hexane was injected to the reactor, and it was stirred at 200 rpm to adjust the polymerization temperature. Subsequently, 0.5 ml of 1 M TIBAL was injected to the reactor, and 30.0 mg of the supported catalyst and 0.5% by weight of CA200 (additive, Univation) were pushed with 0.2 liter of hexane to be injected to the reactor. When the temperature of the reactor reached 80° C., nitrogen was injected such that the total pressure including the vapor pressure of hexane was 1 kgf/cm$^2$, and then 14 kgf/cm$^2$ of ethylene was injected to adjust the total pressure to 15 kgf/cm$^2$. Thereafter, while the reactor was stirred at 1,000 rpm, 1-hexene as a comonomer and hydrogen were injected thereto using a syringe pump. After the reaction was carried out for 1 hour, the reactor was cooled, the reaction gas was removed, and the reactor was opened to obtain the polymer produced. The resulting linear low-density polyethylene was dried at room temperature, and its weight was measured.

Subsequently, the ethylene/1-hexene copolymer was extruded in an extruder having a screw of 40 mm in diameter, a die of 75 mm in diameter, and a die gap of 2 mm at a screw speed of 80 rpm, and it was then subjected to blown film molding at a blow-up ratio of 2.0 to obtain a film having a thickness of 50 μm.

Examples 2 to 13

An ethylene/1-hexene copolymer was prepared in the same manner as in Example 1, except that the hybrid supported catalysts obtained in Preparation Examples 2 to 13 were each used. Subsequently, it was molded in the same manner as in Example 1 to obtain a film having a thickness of 50 μm.

The composition of the catalyst, the amount of 1-hexene in the reactor, and the catalytic activity in Examples 1 to 13 are as shown in Table 1 below.

TABLE 1

| | Transition metal compound | | M1:M2 | 1-hexene | Catalytic activity |
|---|---|---|---|---|---|
| | M1 | M2 | (weight ratio) | (ml) | (gPE/gCat-hr) |
| Ex. 1 | A-1 | B-1 | 1.47:1 | 30 | 5,333 |
| Ex. 2 | A-1 | B-1 | 0.63:1 | 30 | 5,600 |
| Ex. 3 | A-3 | B-1 | 1.43:1 | 30 | 4,567 |
| Ex. 4 | A-3 | B-1 | 0.61:1 | 30 | 6,000 |
| Ex. 5 | A-2 | B-1 | 1.57:1 | 30 | 3,167 |
| Ex. 6 | A-4 | B-1 | 1.25:1 | 30 | 7,200 |
| Ex. 7 | A-4 | B-1 | 0.53:1 | 30 | 5,400 |
| Ex. 8 | A-1 | B-2 | 0.67:1 | 20 | 5,500 |
| Ex. 9 | A-3 | B-2 | 0.65:1 | 20 | 3,333 |
| Ex. 10 | A-2 | B-2 | 0.65:1 | 20 | 3,800 |
| Ex. 11 | A-4 | B-2 | 0.57:1 | 20 | 6,200 |
| Ex. 12 | A-1 | B-3 | 0.61:1 | 20 | 3,867 |
| Ex. 13 | A-4 | B-3 | 0.65:1 | 20 | 3,600 |

Test Example

The physical properties of the resins and films prepared in the Examples and the Comparative Examples were measured according to the following methods and standards. The results are shown in Tables 2 and 3 below.

(1) Melt Index

It was measured at 190° C. under a load of 2.16 kg in accordance with ASTM D1238.

(2) Melt Flow Ratio (MFR)

It was measured at 190° C. under a load of 2.16 kg and 21.6 kg in accordance with ASTM D1238. Their ratio ($MI_{2.16}/MI_{2.16}$) was calculated.

(3) Density

It was measured in accordance with ASTM D638.

(4) Molecular weight and molecular weight distribution

They were measured using gel permeation chromatography-FTIR (GPC-FTIR).

(5) BOCD Index

They were measured using gel permeation chromatography-FTIR (GPC-FTIR).

(6) Number of Short Chain Branches (SCB)

They were measured using gel permeation chromatography-FTIR (GPC-FTIR).

(7) Haze

Haze of the blown film was measured in accordance with ASTM D1003.

(8) Transparency

The transparency of the blown film was measured in accordance with ASTM D1003.

TABLE 2

| | MI (g/10 min) | MFR | Density (g/cm³) | Mw (g/mole) | MWD | BOCD | SCB | Haze (%) | Transparency (%) |
|---|---|---|---|---|---|---|---|---|---|
| Ex. 1 | 1.50 | 27.2 | 0.931 | 102,957 | 3.50 | 0.55 | 8.18 | 10.7 | 88.7 |
| Ex. 2 | 1.14 | 24.0 | 0.927 | 124,536 | 3.20 | 0.41 | 9.61 | 8.1 | 95.4 |
| Ex. 3 | 0.78 | 27.4 | 0.929 | 112,276 | 5.01 | 0.44 | 6.31 | 10.6 | 90.6 |
| Ex. 4 | 0.58 | 24.2 | 0.924 | 119,379 | 3.85 | 0.38 | 6.15 | 13.7 | 88.4 |
| Ex. 5 | 1.42 | 22.0 | 0.922 | 110,566 | 4.67 | 0.29 | 8.91 | 5.3 | 92.6 |
| Ex. 6 | 0.92 | 26.6 | 0.929 | 120,836 | 2.97 | 0.39 | 8.45 | 11.6 | 90.8 |
| Ex. 7 | 1.04 | 23.3 | 0.925 | 129,811 | 3.25 | 0.14 | 11.25 | 9.2 | 94.8 |
| Ex. 8 | 1.23 | 22.8 | 0.928 | 119,070 | 2.90 | 0.85 | 4.30 | 10.2 | 91.2 |
| Ex. 9 | 0.43 | 25.2 | 0.921 | 153,380 | 3.86 | 0.12 | 6.08 | 16.6 | 82.8 |
| Ex. 10 | 0.53 | 24.5 | 0.922 | 125,651 | 4.20 | 0.12 | 6.80 | 14.2 | 87.6 |
| Ex. 11 | 0.50 | 26.9 | 0.928 | 134,116 | 3.42 | 0.36 | 7.11 | 20.1 | 77.1 |
| Ex. 12 | 0.44 | 25.3 | 0.924 | 151,059 | 3.44 | 0.19 | 7.33 | 21.49 | 79.1 |
| Ex. 13 | 0.39 | 25.4 | 0.922 | 158,872 | 3.59 | 0.12 | 9.75 | 26.38 | 74.1 |

As can be seen from Table 2, the polyolefins prepared in the presence of the hybrid supported catalyst prepared in the Examples of the present invention had a relatively wide molecular weight distribution, and short chain branches were relatively more present in the high molecular weight component. In particular, since the MFR of the polyolefin is sufficiently large, the processability is excellent. In addition, since the BOCD index of the polyolefin is a positive value, the mechanical properties are good, and the optical properties such as haze and transparency of the film produced therefrom are good as well.

INDUSTRIAL APPLICABILITY

The hybrid supported catalyst according to the embodiment of the present invention can provide a polyolefin that has excellent processability. The film made of this polyolefin having good mechanical and optical properties can be advantageously used as a stretch film, an overlap film, a ramie, a silage wrap, an agricultural film, and the like.

The invention claimed is:

1. A catalyst for olefin polymerization, which comprises a first transition metal compound represented by Formula A and a second transition metal compound represented by Formula B:

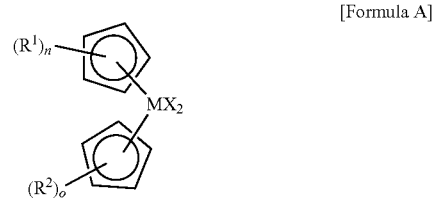

[Formula A]

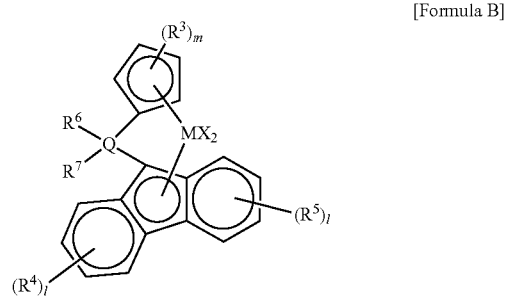

[Formula B]

in Formulae A and B, n is an integer of 0 to 3, is 2, m and l are each an integer of 0 to 4, M is titanium (Ti), zirconium (Zr), or hafnium (Hf), X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, Q is carbon (C), silicon (Si), germanium (Ge), or tin (Sn), $R^1$, and $R^3$ to $R^5$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, or that $R^1$ and $R^2$ are optionally is linked to adjacent groups to form a substituted or unsubstituted unsaturated $C_{4-20}$ ring and $R^6$ and $R^7$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, provided that at least one of $R^6$ and $R^7$ is substituted or unsubstituted $C_{1-20}$ alkyl, wherein olefin polymer prepared from the catalyst has a molecular weight distribution represented as a polydispersity index (Mw/Mn) of 2.0 to 5.5.

2. The catalyst for olefin polymerization of claim 1, wherein m and l are each 1 or 2, X is each independently halogen, M is zirconium, Q is carbon, $R^1$ is $C_{1-20}$ alkyl or linked to adjacent groups to form a substituted or unsubstituted unsaturated $C_{4-20}$ ring, $R^3$ to $R^5$ are each $C_{1-20}$ alkyl, and $R^6$ and $R^7$ are each $C_{1-20}$ alkyl, $C_{2-20}$ alkenyl, or $C_{6-20}$ aryl, provided that at least one of $R^6$ and $R^7$ is $C_{1-20}$ alkyl.

3. The catalyst for olefin polymerization of claim 2, wherein the compound represented by Formula A is one of the compounds represented by Formulae A-1 to A-4, and the compound represented by Formula B is one of the compounds represented by Formulae B-1 to B-3:

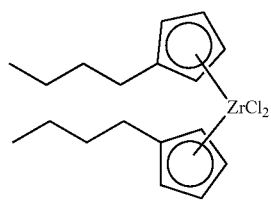

[Formula A-1]

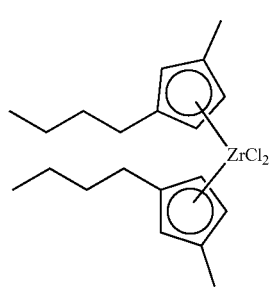

[Formula A-2]

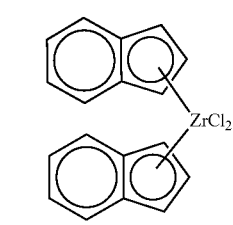

[Formula A-3]

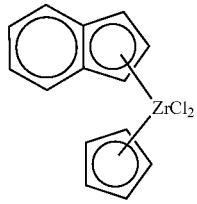

[Formula A-4]

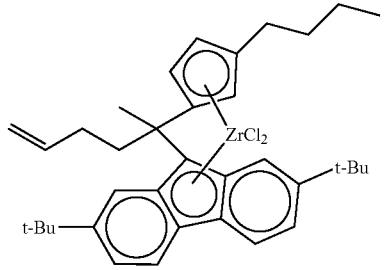

[Formula B-1]

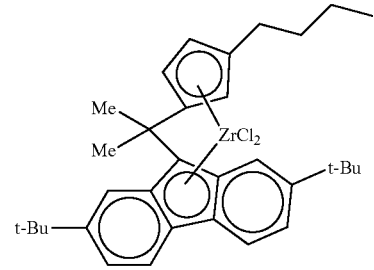

[Formula B-2]

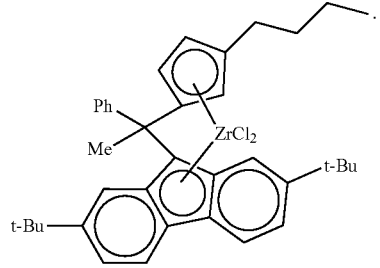

[Formula B-3]

4. The catalyst for olefin polymerization of claim 1, which comprises the first transition metal compound and the second transition metal compound at a weight ratio of 20:1 to 1:20.

5. The catalyst for olefin polymerization of claim 1, which further comprises a cocatalyst compound selected from the group consisting of a compound represented by Formula 1, a compound represented by Formula 2, and a compound represented by Formula 3:

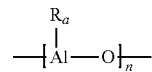

[Formula 1]

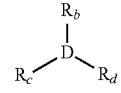

[Formula 2]

$[L-H]^+[Z(A)_4]^-$ or $[L]^+[Z(A)_4]^-$

[Formula 3]

in Formula 1, n is an integer of 2 or more, and $R_a$ may each independently be a halogen atom, $C_{1-20}$ hydrocarbon, or $C_{1-20}$ hydrocarbon substituted with halogen, in Formula 2, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 3, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl.

6. The catalyst for olefin polymerization of claim 5, wherein the compound represented by Formula 1 is at least one selected from the group consisting of methylaluminoxane, ethylaluminoxane, isobutylaluminoxane, and butylaluminoxane.

7. The catalyst for olefin polymerization of claim 5, wherein the compound represented by Formula 2 is at least one selected from the group consisting of trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron.

8. The catalyst for olefin polymerization of claim 5, wherein the compound represented by Formula 3 is at least one selected from the group consisting of triethylammonium tetraphenylborate, tributylammonium tetraphenylborate, trimethylammonium tetraphenylborate, tripropylammonium tetraphenylborate, trimethylammonium tetra (p-tolyl) borate, trimethylammonium tetra (o,p-dimethylphenyl) borate, tributylammonium tetra (p-trifluoromethylphenyl) borate, trimethylammonium tetra (p-trifluoromethylphenyl) borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra (p-tolyl) aluminate, tripropylammonium tetra (p-tolyl) aluminate, triethylammonium tetra (o p-dimethylphenyl) aluminate, tributylammonium tetra (p-trifluoromethylphenyl) aluminate, trimethylammonium tetra (p-trifluoromethylphenyl) aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra (p-tolyl) borate, triethylammonium tetra (o,p-dimethylphenyl) borate, tributylammonium tetra (p-trifluoromethylphenyl) borate, triphenylcarbonium tetra (p-trifluoromethylphenyl) borate, and triphenylcarbonium tetrapentafluorophenylborate.

9. The catalyst for olefin polymerization of claim 1, which further comprises a carrier for supporting the first transition metal compound, the second transition metal compound, or both.

10. The catalyst for olefin polymerization of claim 9, wherein the carrier supports all of the first transition metal compound, the second transition metal compound, and the cocatalyst.

11. The catalyst for olefin polymerization of claim 10, wherein the total amount of the first transition metal compound and the second transition metal compound supported on a carrier is 0.001 to 1 mmole based on 1 g of the carrier, and the amount of the cocatalyst compound supported on a carrier is 2 to 15 mmoles based on the 1 g of the carrier.

12. The catalyst for olefin polymerization of claim 9, wherein the carrier comprises at least one selected from the group consisting of silica, alumina, and magnesia.

13. The catalyst for olefin polymerization of claim 9, which is a hybrid supported catalyst in which the first transition metal compound and the second transition metal compound are supported together.

14. The catalyst for olefin polymerization of claim 9, which is a hybrid supported catalyst in which the first transition metal compound, the second transition metal compound, and the cocatalyst compound are supported together on silica.

* * * * *